April 25, 1961 H. FRANTZ 2,981,848

PULSE CONTROLLED MULTIVIBRATOR

Filed Nov. 20, 1958 2 Sheets-Sheet 1

INVENTOR
HERMANN FRANTZ
BY Alvin J. Riddles
ATTORNEY

United States Patent Office 2,981,848

Patented Apr. 25, 1961

2,981,848

PULSE CONTROLLED MULTIVIBRATOR

Hermann Frantz, Boeblingen, Germany, assignor to International Business Machines Corporation, New York, N.Y., a corporation of New York Filed Nov. 20, 1958, Ser. No. 775,216

12 Claims. (Cl. 307—88)

This invention relates to multivibrators and, in particular, to multivibrators wherein the oscillating or non-oscillating state is controlled by a pulse.

Pulse controlled multivibrators are understood to be multivibrators in which the oscillating condition is initiated by an external pulse applied to the multivibrator circuit. Such arrangements are well known. They do, however, not possess any storage features and are accordingly affected by a disturbance, e.g. a short interruption of their voltage supply, in their oscillation. Thus, the information content as represented, e.g. by the oscillating or non-oscillating condition is lost after a disturbance in the voltage supply. Therefore, the condition of the known pulse controlled multivibrators appearing after the restoration of the power voltage is mostly of an accidental nature.

In contrast thereto, it is very essential in electronic computer systems that the information be safely preserved independently of all kinds of disturbances. This is true particularly for those parts effecting the value of the input and output as longer storage times are necessary at such points.

The arrangement of the invention solves the problem of providing a multivibrator the information of which is preserved over any desired periods of dead time by associating with each of two amplifier triodes an element having a substantially rectangular hysteresis loop which is constanttly kept at a saturation point, by causing a current through the amplifier triode which is in its conductive state but which is normally blocked to move the element connected in series with said triode to the other point of saturation, and by the provision that the switchback to the constant saturation point produces a pulse for effecting the current conductive condition of the triode connected in series with said other element. A very simple arrangement is obtained if junction transistors are used as amplifier triodes and magnetic cores as elements having a rectangular hysteresis loop. It is also possible to use high-vacuum triodes as amplifier triodes and ferroelectrics as elements having a rectangular hysteresis loop.

An advantageous and particularly simple application of a multivibrator of the invention for producing an optical indication especially of the magnetic condition of certain magnetic cores is obtained by arranging a common low voltage incandescent lamp or a correspondingly dimensioned relay winding in parallel or in series with one of the current limiting resistors of the collector circuit. This indicating device is caused by an input pulse to emit a signal. The said pulse may be substantially shorter than the rise time, e.g. of the light emission of an incandescent lamp or the pick-up time of a relay of the indicating device. The indication will be preserved after the end of the input pulse. Even after an intervening longer turn-off time such a device will, on being turned on again, continue to indicate whether at a given earlier time an input pulse had occurred. Considering the function of the indicating device, the circuit thus has bistable properties.

In an advantageous further development of the invention the responsiveness to the input pulses is further increased by the provision that the transistors are in addition fed back through the magnetic core connected to their collector circuits.

It is an object of this invention to provide an improved pulse controlled multivibrator.

It is another object of this invention to provide a pulse controlled multivibrator with memory.

It is still another object of this invention to provide an improved bistable multivibrator.

It is a related object of this invention to provide an improved indicating device for a pulse controlled multivibrator.

Other objects of the invention will be pointed out in the following description and claims and illustrated in the accompanying drawings, which disclose, by way of example, the principle of the invention and the best mode, which has been contemplated, of applying that principle.

Figure 1:
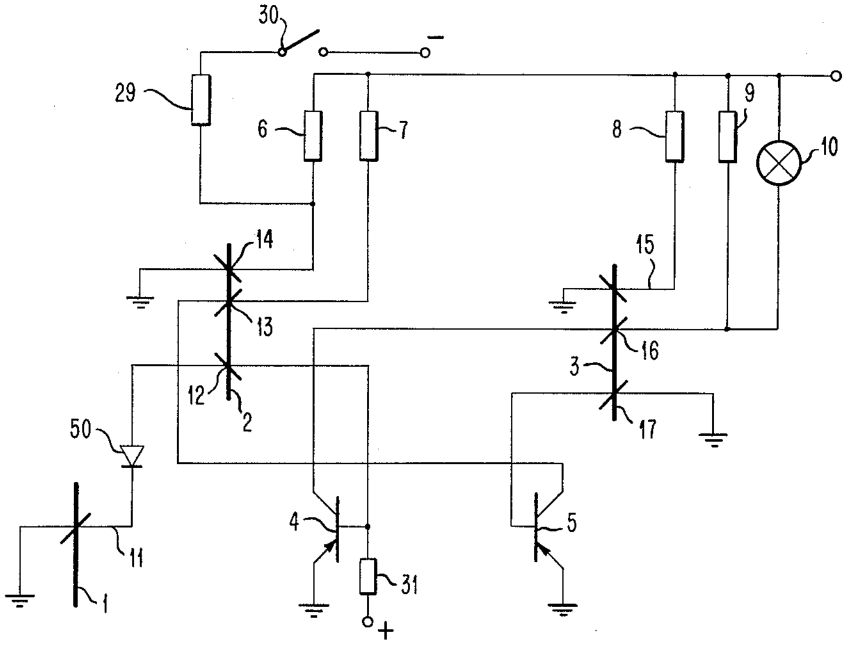
Figure 1 represents an arrangement according to the invention including a multivibrator with transistors and magnetic cores.

The multivibrator shown in Figure 1 includes a signal core the storage condition of which is to be indicated. Two transistors, 4 and 5, in a grounded-emitter circuit act with their collector electrodes on one magnetic core 2 or 3 each. Each of said magnetic cores is linked by one bias winding 14 and 15, respectively, and with another winding 12 and 17, respectively, it is cross-coupled with the base electrodes of the transistors 4 or 5. Arranged in parallel to the current limiting resistance 9 in the collector circuit of the transistor 4 is an incandescent lamp 10 with a filament for approximately 6 volts, 50 milliamperes. An erasing pulse may be applied to the device through the resistor 29 and the switch 30.

Figure 1A:
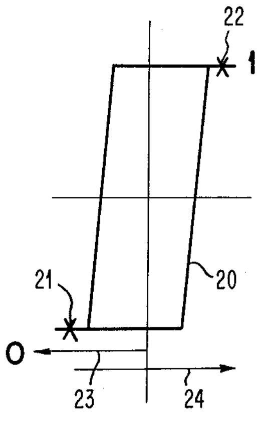
Figure 1A illustrates a magnetizing loop of a magnetic core.

Through the windings 14 and 15, the magnetic cores 2 and 3, respectively, are constantly supplied with a current adjusted by the resistors 6 and 8, respectively, to the value corresponding to the length of the arrow 23 in Figure 1A. This current I*m* is so large and adjusted so that it biases the magnetic core from the point of remanence up into saturation at point 21. This condition is in the computer technique generally assigned the storage of a binary "zero." On the other hand, the resistances 7 and 9 in the collector circuits are chosen so large that, considering the number of turns of the windings 13 and 16, respectively, in the collector circuits, they cause a current having at least double the magnitude and causing magnetization in the opposite direction according to the arrow 24 in Figure 1A. This current will, therefore, switch a magnetic core from the "0" condition into its "1" condition.

Figure 1B:
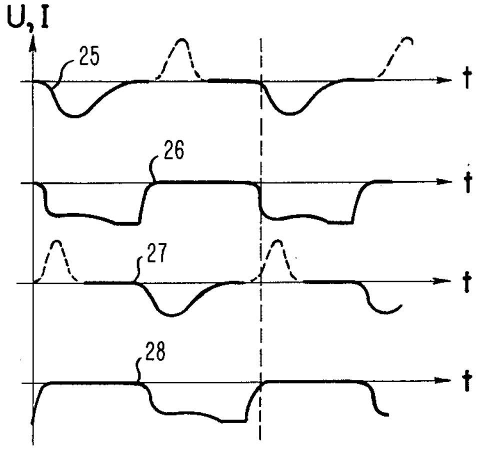
Figure 1B shows typical voltage curves occurring at given points of the circuit of Figure 1.

Initially, both magnetic cores 2 and 3 are reset to point 21 representing "0." If now a "1" is set up in the signal core 1 corresponding to point 22 of the magnetizing curve, there will be induced in winding 11 a pulse polarized so that it polarizes the emitter-base diode of the transistor 4 in the forward direction thus effecting a current flow in the emitter-collector path of the transistor 4. In Figure 1B the pulse emitted by the winding 11 of the signal core 1 is represented by the first negative pulse of the curve 25. The resulting current flow in the collector of the transistor 4 corresponds to the first negative pulse of the curve 26. By the load represented by the emitter-base path the input pulse is somewhat reduced in its amplitude and also extended a little. Through the winding 16, the magnetic core 3 is now set up by the collector current of the transistor 4 in the write direction, i.e., to point 22 corresponding to a "1." The resulting pulse in the winding 17 of the core 3 is positively directed at the base of the transistor 5 and can, therefore, not change the nonconductive condition of the transistor 5. The condition "1" of the magnetic core 3 is, however, stable only for the duration of the collector current of the transistor 4. With the termination of that current (curve 26) the core 3 will first return to the remanent "1" state. However, by reason of the current constantly flowing in the winding 15, the curve is immediately read out. This change of flux induces a negative going pulse in the winding 17 according to curve 27 at the base of the transistor 5. Thereby the transistor 5 is rendered conductive and by the collector current flowing in the winding 13 writes a "1" into the core 2. With the termination of the induced pulse at the base of the transistor 5 also the collector current pulse 28 is terminated. Thus, the constant bias can read out the core 2 to "0." The negative pulse produced by this flux reversal (second negative pulse in curve 25) thus again opens the base-emitter diode of the transistor 4. For the production of further pulses, this pulse replaces the pulse first produced in the winding 11 of the core to be indicated, which is arranged in series with the winding 12. The multivibrator will continue to oscillate although the core 1 does not produce any further signal. The oscillation frequency is essentially determined by the switching times of the cores and transistors.

Into the base circuit of the transistor 4 there may also be included a diode 50 poled so that it blocks a positive pulse produced on the readout of the core 1 associated e.g. with a storage to be indicated. This positive pulse might happen to coincide with a negative pulse induced in the winding 12 and thus turn off the multivibrator. Through the resistor 31, the base is provided with a D.C. path to ground also during the blocked condition of the diode. A simple indication of the oscillating condition of the multivibrator is obtained by connecting a normal incandescent lamp 10 to one of the collector circuits, e.g. in parallel to the resistor 9. If the supply voltage is interrupted during the oscillating condition, the multivibrator will, after the restoration of the voltage, resume its oscillation whenever it was also in an oscillating condition prior to the voltage failure. According to Figure 1 one magnetic core is in general always in its "1" condition, so that on the restart of the power supply voltage that respective core is read out by the constant bias to "0," thus rendering the other transistor conductive. Also if the supply voltage is turned on gradually, the magnetic core will, due to the rectangular shape of the hysteresis loop 20, nevertheless switch suddenly, and the oscillations will be resumed. If the voltage is interrupted at a time when e.g. one magnetic core is magnetized almost to "0" whereas the other one has not yet been fully magnetized to "1," the oscillations will be resumed with the voltage starting again, as the magnetic cores exist in corresponding points of remanence intermediate the "0" and "1" conditions. It is, of course, necessary that the respective winding connected to the base be provided with a sufficiently high number of turns, so that it will be able to render the transistor conductive also by a small inductive pulse. By a suitable selection of the switching elements, particularly the magnetizing windings, it may be insured that during the reversal of the magnetic condition always one core is written sufficiently far in the direction toward "1," i.e. that there is sufficient overlapping.

Cut-off of the multivibrator may be effected in different manners. It is, e.g., possible to short-circuit an additional winding on one of the cores or by operating the switch 30 to cause a bias current to flow through the resistor 29, which has such a high magnitude that the core 2 can no longer be set up by the collector current of the transistor 5. Furthermore, it is possible through a winding threaded through both magnetic cores to effect cut-off by a sufficient bias beyond the point 21 ("0"). Such cut-off has the advantage that a relatively short pulse suffices.

Figure 3:
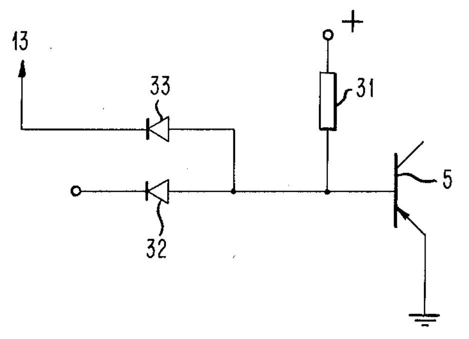
Figure 3 shows another type of pulse control.

The oscillating condition might also be initiated by a winding threaded through one of the cores 2 or 3 in such a manner that a pulse on said winding sets up the magnetic core affected thereby to "1." According to Figure 3, it is moreover possible by a low-power pulse through a diode 32 polarized so that a feedback pulse cannot leak off through the signal source at the base e.g. of the transistor 5 to effect current flow in the collector. The diode 33 will then, similar to the diode 32, prevent the signal pulse from leaking off through the cross-coupling winding 17.

Figure 2:
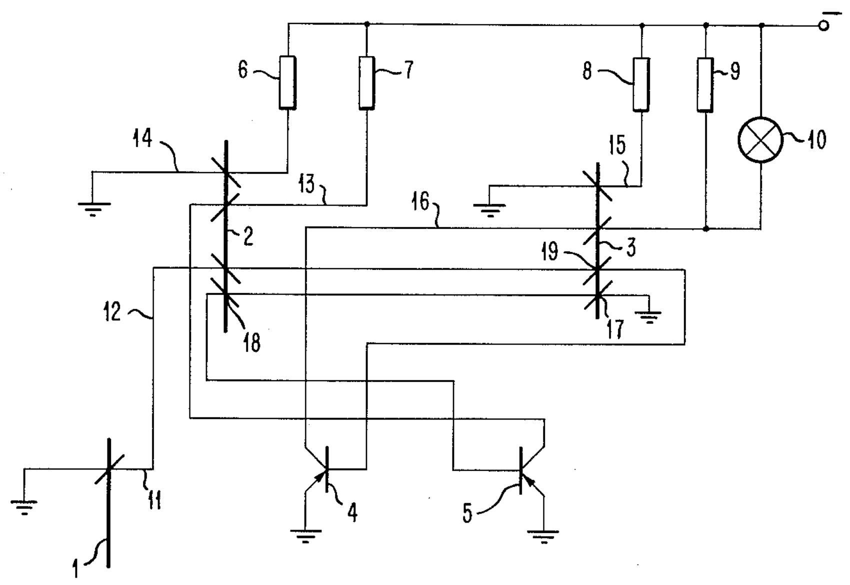
Figure 2 represents an arrangement of a multivibrator according to Figure 1 with feedback connections.

Those parts in Figure 2 corresponding to parts shown in Figure 1 are provided with equal reference characters. Here, the conductors which have so far been directly connected to the base electrodes are, however, in addition threaded through the respective magnetic core connected to the collector of the same transistor, these windings 18 and 19, respectively, being polarized so that a direct feedback connection is established between the collector and the base of each individual transistor. Consequently, the signal impulse may here have an even shorter duration, particularly it may also be short as compared to the switching time of the magnetic core. This circuit is suited particularly for indicating the occurrence of certain extremely short pulses.

There will now follow a chart indicating the switching parameters of the components used with which the circuit has been operated satisfactorily:

| | |
|---|---|
| Resistor 6, 8 | 50 ohms. |
| Resistor 7, 9 | 50 ohms. |
| Resistor 29 | 25 ohms. |
| Transistor 4, 5 | OC 44 and OC 45, respectively, PNP junction transistors manufactured by Philips. |
| Switching core 2, 3 | 6 E1 of Phillips, $Da=3.8$ mm. |
| Incandescent lamp 10 | 6 volts, 0.3 watts. |
| Winding 14, 15 | 5 turns. |
| Winding 13, 16 | 15 turns. |
| Winding 12, 17 | 5 turns. |
| Winding 18, 19 | 5 turns. |

The above set of specific circuit values is provided only to aid in understanding and practicing the invention and since there is a wide range of such sets of values available to one skilled in the art, the provision thereof should not be construed as a limitation.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims:

What is claimed is:

1. A pulse controlled multivibrator comprising in combination first and second amplifier triodes, each having at least input, output and control electrodes, first and second energy storage elements, each said energy storage element having a substantially rectangular hysteresis loop indicative of discrete energy states, means biasing each of said first and second energy storage elements to saturation, means coupling current flow in said first and second amplifier triodes respectively to said first and second energy storage elements, first feedback means responsive to changes in energy state coupling said second energy storage element with the control electrode of said first amplifier triode, second feedback means responsive to changes in energy state coupling said first energy storage element with the control electrode of said second amplifier triode and signal introduction means operable in response to external signals to change energy state of said first energy storage element.

2. The multivibrator of claim 1 wherein said first and said second amplifier triodes are transistors.

3. The multivibrator of claim 2 wherein said first and second energy storage elements are rectangular hysteresis loop magnetic cores.

4. The multivibrator of claim 3 including a low voltage indicating device connected so as to be responsive to current flow in said second transistor.

5. A circuit comprising in combination first and second energy storage elements each having a substantially rectangular energy characteristic, means biasing each of said first and said second energy storage elements in a particular position of said substantially rectangular output characteristic curves, first and second amplifier triodes, means providing coupling of current flow through each of said first and second amplifier triodes to each of said first and said second energy storage elements respectively, first feedback means connected in controlling retionship to said second amplifier triode and responsive to change in energy state in said first energy storage element, second feedback means connected in controlling relationship to said second amplifier triode and responsive to change in energy state of said first energy storage element and means operable to change the energy state of said first energy storage element.

6. The circuit of claim 5 wherein said first and said second amplifier triodes are transistors.

7. The circuit of claim 5 wherein said first and said second energy storage elements are magnetic cores.

8. The circuit of claim 6 wherein said first and said second energy storage elements are magnetic cores.

9. A pulse controlled multivibrator comprising in combination a source of power, a first transistor, a second transistor, means of connecting the emitters of said first and second transistors to a reference potential, means connecting one terminal of said source of power to said reference potential, a first rectangular hysteresis loop magnetic core, a second rectangular hysteresis loop magnetic core, means connecting the collectors of each said first and said second transistors respectively through said first and second magnetic cores to the remaining terminal of said source of power, means including said source of power for biasing each said first and said second magnetic cores in a specific remanent condition, first feedback means associated with said first magnetic core and connected to the base of said second transistor, second feedback means associated with said second magnetic core and connected to the base of said first transistor, and signal means coupled to said first magnetic core and capable of changing in response to external signals the remanent state therein.

10. The circuit of claim 9 wherein said input signal means includes means for blocking pulses of incorrect polarity.

11. The circuit of claim 10 wherein said blocking means is an appropriately poled diode.

12. The circuit of claim 10 wherein a low voltage indicating device is connected in responsive condition to current flow through said second transistor.

References Cited in the file of this patent

UNITED STATES PATENTS

| | | |
|---|---|---|
| 2,740,086 | Evans et al. | Mar. 27, 1956 |
| 2,774,878 | Jensen | Dec. 18, 1956 |